United States Patent [19]
Schultz et al.

[11] Patent Number: 5,582,202
[45] Date of Patent: Dec. 10, 1996

[54] AIR CONDITIONER SYSTEM CHARGE/RELIEF VALVE

[75] Inventors: Jeffrey A. Schultz, Pittsville; Major Gilbert, Gladys, both of Va.

[73] Assignee: Bridge Products, Inc., Northbrook, Ill.

[21] Appl. No.: 360,605

[22] Filed: Dec. 21, 1994

[51] Int. Cl.⁶ ............................... F16K 17/168
[52] U.S. Cl. ............... 137/493.3; 62/174; 251/149.6; 137/493.6
[58] Field of Search ............ 137/493.3, 599.2, 137/493.6; 251/149.6; 62/174, 292

[56] References Cited

U.S. PATENT DOCUMENTS

| | | |
|---|---|---|
| 637,994 | 11/1899 | Klay . |
| 1,153,770 | 9/1915 | Daymon . |
| 1,229,885 | 6/1917 | Chadwick . |
| 1,933,454 | 10/1933 | Sidney . |
| 2,232,113 | 2/1941 | Katcher ................. 137/493.3 |
| 2,484,083 | 10/1949 | Findley ................. 137/493.3 |
| 3,153,423 | 10/1964 | Biello et al. . |
| 3,426,787 | 2/1969 | Fuller ................... 137/493.6 |
| 3,454,033 | 7/1969 | Smith ................. 137/493.6 X |
| 3,499,688 | 5/1966 | Reynolds . |
| 3,896,845 | 7/1975 | Parker . |
| 4,182,370 | 1/1980 | Karcher ................. 62/292 X |
| 4,648,369 | 3/1987 | Wannenwetsch . |
| 4,692,102 | 9/1987 | Hafele et al. . |
| 5,029,604 | 7/1991 | Spektor et al. ......... 137/493.3 X |

OTHER PUBLICATIONS

Bridgeport DWG 614281–Air Conditioner Charge Valve (Apr. 14, 1993).
Bridgeport DWG 540357–Air Conditioner Pressure Relief Valve (Oct. 19, 1993).
Sedco DWG–Air Conditioner Pressure Relief Valve (Jan. 19, 1989).
Ford DWG F03H–19D644–AA–Air Conditioner Pressure Relief Valve (Nov. 4, 1985).
Zexel DWG KC–45/50–Air Conditioner Pressure Relief Valve (Undated).
DWG–Prior Art Harrison Air Conditioner Charge Valve (Undated).
DWG–Prior Art Air Conditioner Charge Valve. (Undated).
DWG SD–510ZB9652–Prior Art Air Conditioner Pressure Relief Valve (Undated).

*Primary Examiner*—Stephen M. Hepperle
*Attorney, Agent, or Firm*—Brinks Hofer Gilson & Lione

[57] ABSTRACT

A combined charge/relief valve for an air conditioner system includes an outer housing that defines a first passageway and an inner housing that defines a second passageway. The inner housing includes an O-ring seal and is biased by an outer spring to a sealed position to seal the first passageway. The inner housing can be moved to a charging position by the direct application of mechanical force in order to facilitate high rate charging of the air conditioner system. The inner housing includes a valve member movable between an opened and a closed position to seal the inner passageway. The valve member is biased to the closed position by a precision relief spring. Excessive refrigerant pressure in the air conditioner system moves the valve member from the closed to the open position in order to vent refrigerant to the environment.

18 Claims, 2 Drawing Sheets

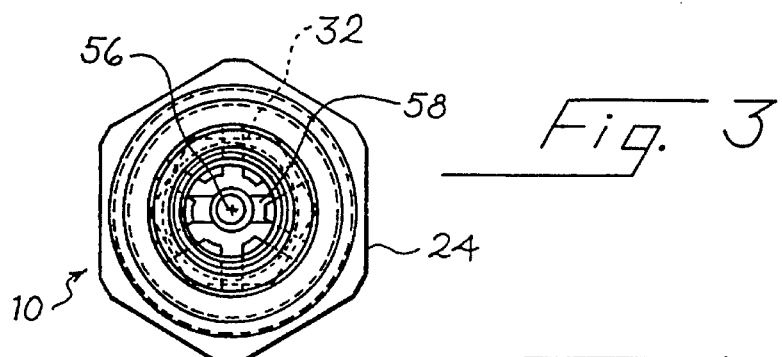
Fig. 3
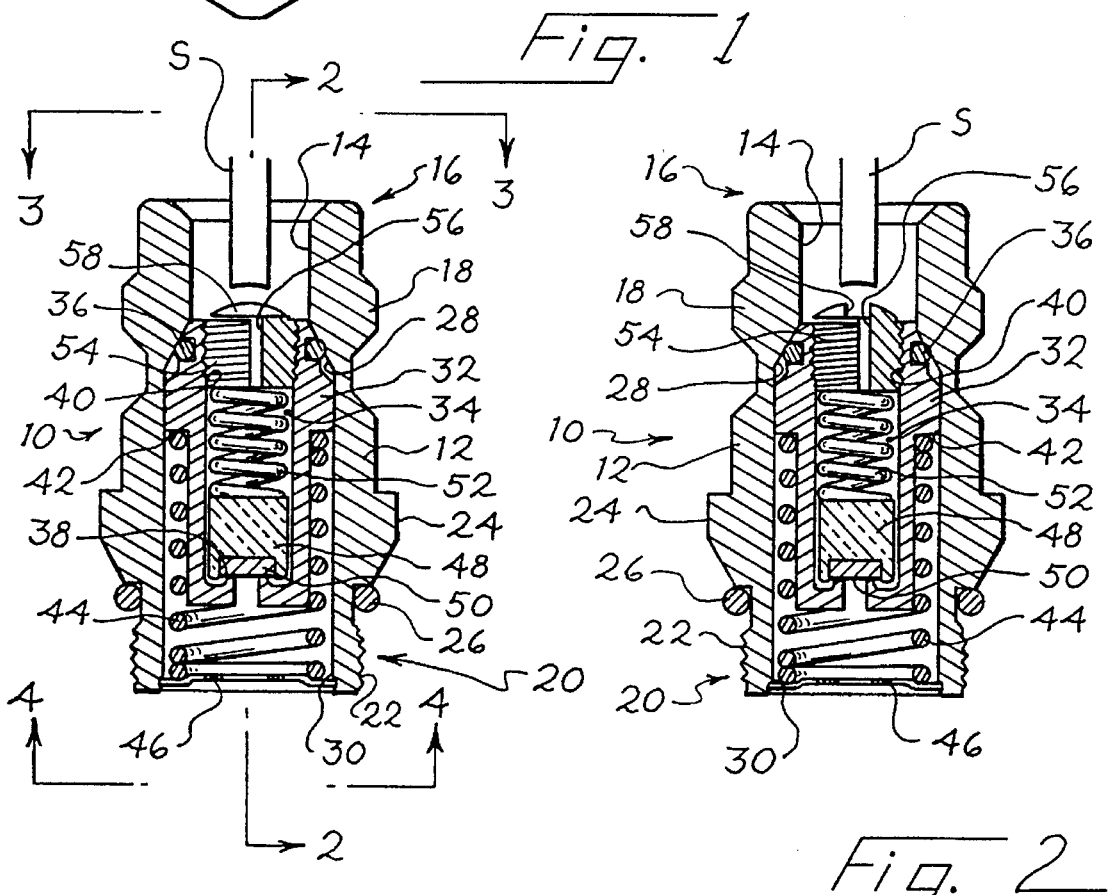
Fig. 1
Fig. 2
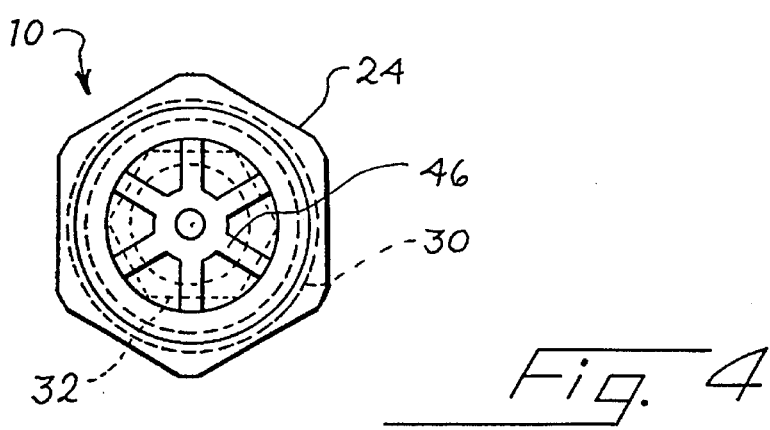
Fig. 4

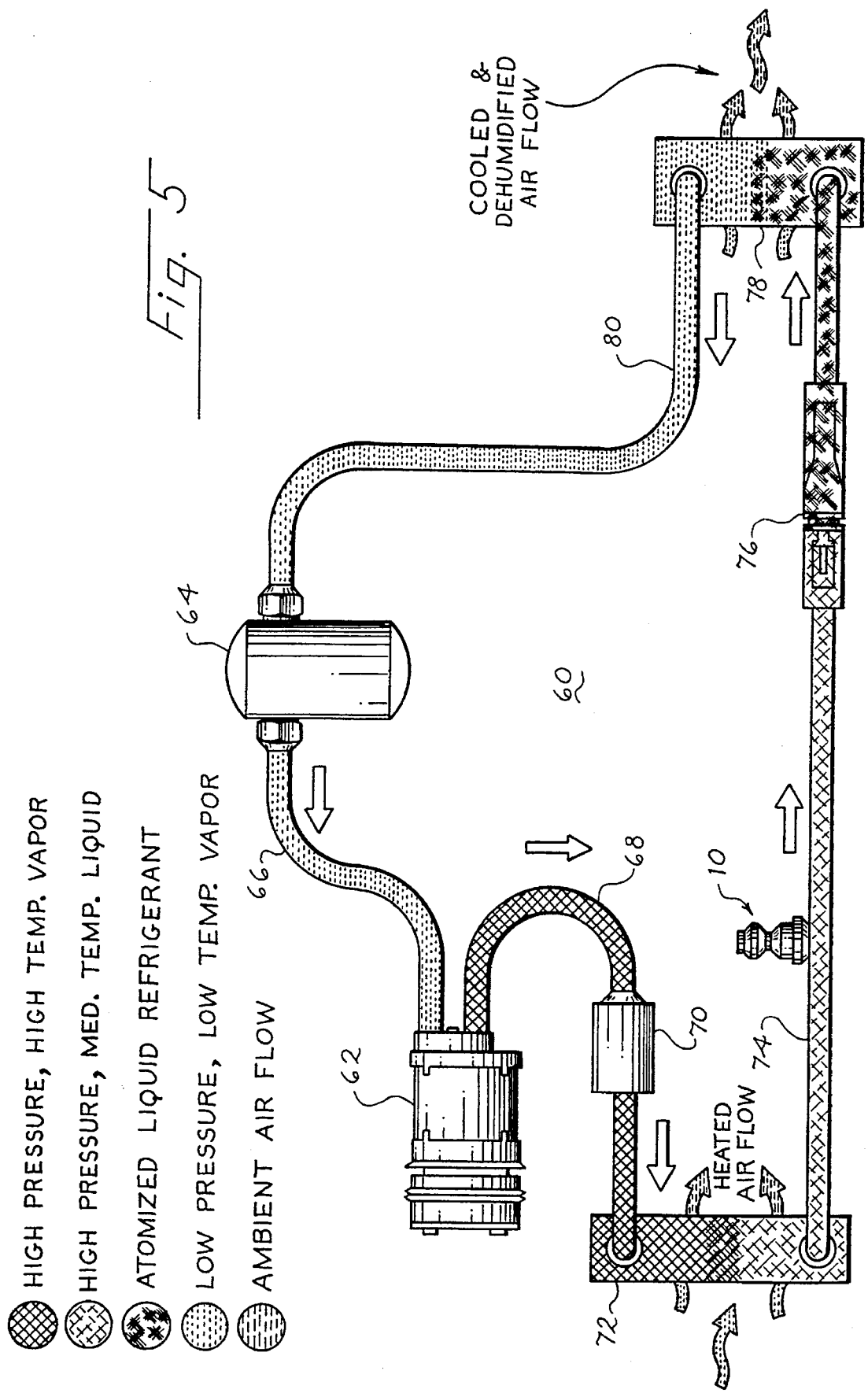

AIR CONDITIONER SYSTEM CHARGE/RELIEF VALVE

BACKGROUND OF THE INVENTION

This invention relates to an integrated charge/relief valve for an air conditioner system.

In the past, air conditioner systems such as automotive air conditioner systems have typically included a charge valve and a separate relief valve. The charge valve is used for introducing refrigerant into the air conditioner system, and the relief valve prevents excessive pressures from being developed within the air conditioner system by releasing refrigerant from the air conditioner system when necessary.

Sidney U.S. Pat. No. 1,933,454 and Wannenwetsch U.S. Pat. No. 4,648,369 disclose valves for use in fuel injection systems. These valves control flow in both directions through the valve body, by respective valving elements. However, the valves of these patents do not include high reliably elastomeric-metal seals, they are not disclosed as charging valves open at one end to the environment, and they generally are not suitable for use as air conditioner charge/relief valves.

Biello U.S. Pat. No. 3,153,423 discloses a two-way check valve for a container or hydraulic system. This check valve is designed to relieve pressure in opposite directions.

None of the above-referenced patents discloses a valve suitable for use in an air conditioner charging operation of the type utilizing a quick disconnect coupler having a pin that mechanically opens the valve during high flow rate charging operations. A need, therefore, exists for an improved air conditioner system valve having improved reliability, reduced complexity, and reduced cost as compared to conventional charge and relief valves.

SUMMARY OF THE INVENTION

According to this invention, an air conditioner system charge/relief valve is provided comprising an outer housing, an inner housing, and a valve member. The outer housing comprises a first passageway extending therethrough from a first end to a second end of the outer housing, and a quick release shoulder is formed adjacent an outer surface of the first end. The inner housing is mounted in the first passageway for movement between a sealed position, in which the inner housing seals the first passageway, and a charging position, in which the inner housing opens the first passageway for charging. The inner housing has a second passageway formed therein, and the inner housing is closer to the first end in the sealed position than in the charging position. The valve member is mounted in the second passageway for movement between a closed position, in which the valve member seals the second passageway, and an opened position, in which the valve member opens the second passageway for pressure relief. The valve member is closer to the second end in the closed position than the opened position. An inner spring is mounted in the second passageway to bias the valve member toward the second end to the closed position. An outer spring is mounted in the first passageway to bias the inner housing toward the first end to the sealed position. The inner housing is accessible via the first end for receiving opening forces during a charging operation.

The preferred embodiment described below, by integrating the charge and relief valves in an air conditioner system, reduces the number of components. This embodiment promotes higher system reliability, since there are fewer components to leak or malfunction. Costs for components and system assembly are reduced.

BRIEF DESCRIPTION OF THE DRAWINGS

FIG. 1 is a longitudinal sectional view of a preferred embodiment of the charge/relief valve of this invention.

FIG. 2 is a cross-sectional view taken along line 2—2 of FIG. 1.

FIG. 3 is a top view taken along line 3—3 of FIG. 1.

FIG. 4 is a bottom view taken along line 4—4 of FIG. 1.

FIG. 5 is a schematic representation of an automotive air conditioner system which includes the charge/relief valve of FIG. 1.

DETAILED DESCRIPTION OF THE PRESENTLY PREFERRED EMBODIMENTS

Turning now to the drawings, FIGS. 1 through 4 show four views of an air conditioner system charge/relief valve 10 which incorporates the present invention.

The valve 10 includes an outer housing 12 which defines a central passageway 14 extending from a first end 16 to a second end 20 of the housing 12. An outer portion of the housing adjacent the first end 16 defines a conventional quick release shoulder 18. The exterior surface of the second end 20 defines exterior threads 22. The housing 12 defines an enlarged central portion between the first and second ends 12, 20 which defines an array of six wrench flats 24 used for installing and removing the valve 10. An O-ring 26 is positioned around the housing 12 to seal the housing 12 to an air conditioner system described below. The interior surface of the housing 12 adjacent the passageway 14 includes an annular valve seat 28 adjacent the first end 16 as well as a peripheral groove 30 adjacent the second end 20.

An inner housing 32 is mounted for axial movement within the passageway 14. The inner housing 32 has a generally hexagonal cross section at its widest part to allow fluid to flow through the passageway 14 around the inner housing 32 when the inner housing 32 is moved to a charging position described below. The inner housing 32 defines a second passageway 34 extending therethrough. This second passageway 34 terminates in a valve seat 38 at one end. An O-ring seal 36 is mounted to the inner housing 32 so as to seal against the valve seat 28 when the inner housing 32 is in the sealed position shown in FIGS. 1 and 2.

The inner housing 32 defines a set of interior threads 40 at the end of the housing 32 adjacent to the O-ring seal 36. In addition, the inner housing 32 defines an exterior shoulder 42, which is facing downwardly when the valve 10 is in the position shown in FIGS. 1 and 2.

An outer spring 44 which in this embodiment is a compression coil spring is mounted around the inner housing 32 so as to bear on the shoulder 42. The opposite end of this outer spring 44 bears against a spring retainer 46 which is secured in the peripheral groove 30. The outer spring 44 biases the inner housing 32 toward the first end 16, thereby tending to hold the inner housing 32 in the sealed position shown in FIGS. 1 and 2. In this position, the O-ring seal 36 and the valve seat 28 cooperate to close the passageway 14. The groove 30 can be machined in the housing 12 or the retainer 46 can be held in place by rolling the housing 12 after assembly to deform the housing 12 over the retainer 46.

A valve member 48 is mounted for axial movement within the inner housing 32. The valve member 48 carries at its lower end an elastomeric seal 50 positioned to releasably seal against the valve seat 28. An inner spring 52 bears on the valve member 48 and reacts against a spring keeper 54. The spring keeper 54 is threadedly engaged in the interior threads 40, and the inner spring 52 biases the valve member 48 to a closed position, in which the elastomeric seal 50 closes the valve seat 38. The spring keeper 54 defines a central bore 56 and a cross slot 58. The cross slot 58 is used when installing or removing the spring keeper 54. The inner spring 52 is preferably a precision-calibrated relief spring that ensures that the valve member 48 remains in the closed position shown in FIGS. 1 and 2 until internal pressures in the air conditioner system exceed a predetermined level. At this point, these pressures lift the valve member 48 away from the valve seat 38, and pressurized refrigerant from the air conditioner system is allowed to flow through the valve seat 38, between the valve member 58 and the inner housing 32, through the bore 56 into the environment.

The valve 10 can be made of conventional materials. For example, brass alloys can be used for the outer housing 12, the inner housing 32, the valve member 48 and the spring keeper 54. Zinc alloys and various plastics such as nylon may be suitable. The retainer 46 can be made of a spring steel, and the elastomeric seal 50 and the O-ring seals 36, 26 can be made of suitable elastomeric material such as Nitrile, Neoprene, HNBR, EPDM, Teflon (TM) or Buna N. Suitable HNBR can be obtained from Dowty as compound 2709 or from Parker as compound N1173. Suitable Nitrile can be obtained from National as compound N2a.

FIG. 5 shows the manner in which the valve 10 can be installed in an air conditioner system 60. The air conditioner system 60 is a typical automotive air conditioner system, and it includes a compressor 62 that draws refrigerant from an accumulator 64 via a suction line 66. The compressor 62 supplies pressurized refrigerant via a discharge line 68 and a muffler 70 to a condenser 72. In the condenser the pressurized refrigerant is cooled, and the cooled pressurized refrigerant passes via a liquid line 74 and an orifice tube 76 to an evaporator 78. Ambient air flowing through the evaporator 78 is cooled and dehumidified, and the consequently warmed refrigerant is then returned via a jumper line 80 to the accumulator 64.

The foregoing features of the air conditioner system 60 are entirely conventional. According to this invention, the charge/relief valve 10 is mounted at a convenient point in the high pressure portion of the air conditioner system 10, typically between the outlet of the compressor 62 and the orifice tube 76.

The charge/relief valve 10 performs two separate functions. First, it is used to charge the air conditioner system 60 with refrigerant. A charging hose (not shown) is releasibly coupled to the valve 10 by a quick release coupler (not shown) which engages the quick release shoulder 18. This quick release coupler (not shown) includes a stem S which is shown schematically in FIGS. 1 and 2. The stem S applies mechanical forces to the upper surface of the spring keeper 54 and thereby to the inner housing 32, thereby moving the inner housing 32 downwardly as shown in FIGS. 1 and 2 from the sealed position to the charging position. Once the inner housing 32 has been moved downwardly to open the passageway 14, refrigerant can be charged into the air conditioner system 60 at high flow rates. As explained above, the hexagonal shape of the inner housing 32 facilitates high rate charging once the inner housing has been moved to the charging position.

Once charging has been completed, the charging hose is removed, and the O-ring seal 36 provides a high reliability seal that substantially prevents the leakage of refrigerant out of the interior of the air conditioner system 60 to the environment.

In the event of a malfunction such that the compressor 62 pressurizes the discharge line 68 or the liquid line 74 above a predetermined maximum allowable pressure, the valve 10 performs a second function, pressure relief. Pressurized refrigerant in the air conditioner system 60 lifts the valve member 48 and the elastomeric seal 50 away from the valve seat 32, and pressurized refrigerant is then allowed to escape via the second passageway 34 to the environment. The elastomeric seal 50 is a high reliability, low leakage seal that substantially prevents the leakage of refrigerant during normal operation of the air conditioner system 60. The inner spring 52 is a high-precision relief spring that ensures that the valve seat 38 remains sealed until refrigerant pressure exceeds the predetermined maximum allowable pressure.

Because both the charging function and the pressure relief function have been integrated into the single valve 10, the number of openings in the air conditioner system 60 to the environment has been reduced. System assembly is simplified because only a single valve 10 must be mounted to the system 60 to achieve both the charging and the relief functions.

Of course, it should be understood that a wide range of changes and modifications can be made to the preferred embodiment described above. For example, materials, proportions and structural details such as the shape and arrangement of the spring retainers and the individual valves can all be modified as intended for the particular application. If desired, the charge valve may be placed within the pressure relief valve, such that the outer passageway 14 is used for pressure relief flow and the second passageway 34 is used for charging flow. It is, therefore, intended that the foregoing detailed description be regarded as illustrative rather than limiting, and that it be understood that it is the following claims, including all equivalents, that are intended to define the scope of this invention.

We claim:

1. An air conditioner system charge/relief valve comprising:

an outer housing comprising a first passageway extending therethrough from a first end to a second end of the outer housing, and a quick release shoulder formed adjacent an outer surface of the first end;

an inner housing mounted in the first passageway for movement between a sealed position, in which the inner housing seals the first passageway, and a charging position, in which the inner housing opens the first passageway for charging, said inner housing having a second passageway formed therein, said inner housing being closer to the first end in the sealed position than the charging position;

a valve member mounted in the second passageway for movement between a closed position, in which the valve number seals the second passageway, and an opened position, in which the valve member opens the second passageway for pressure relief, said valve member being closer to the second end in the closed position than the opened position;

an inner spring mounted in the second passageway to bias the valve member toward the second end to the closed position;

an outer spring mounted in the first passageway to bias the inner housing toward the first end to the sealed position;

said inner housing accessible via the first end for receiving opening forces during a charging operation;

wherein a portion of the inner spring extends within a volume bounded by the outer spring.

2. The air conditioner system charge/relief valve of claim 1 mounted in place in an air conditioner system such that the second end is in fluid communication with an interior portion of the air conditioner system, and the first end is in fluid communication with a region exterior to the air conditioner system.

3. The invention of claim 1 wherein the inner housing comprises an elastomeric seal positioned to seal against the outer housing when the inner housing is in the sealed position.

4. The invention of claim 3 wherein the valve member comprises a second elastomeric seal positioned to seal against the inner housing when the valve member is in the closed position.

5. The invention of claim 1 wherein the inner spring comprises a precision relief spring.

6. The invention of claim 1 wherein the inner housing comprises a spring keeper, and wherein the inner spring reacts against the spring keeper; said spring keeper accessible via the first end for receiving opening forces during a charging operation.

7. An air conditioner system charge/relief valve comprising:

an outer housing comprising a first passageway extending therethrough from a first end to a second end of the outer housing, and a quick release shoulder formed adjacent an outer surface of the first end;

an inner housing mounted in the first passageway for movement between a closed position, in which the inner housing closes the first passageway, and an opened position, in which the inner housing opens the first passageway, said inner housing having a second passageway formed therein;

a valve member in the second passageway for movement between a closed position, in which the valve member closes the second passageway, and an opened position, in which the valve member opens the second passageway;

an inner spring mounted in the second passageway to bias the valve member toward the respective closed position;

an outer spring mounted in the first passageway to bias the inner housing toward the respective closed position;

one of said inner housing and said valve member accessible via the first end for receiving opening forces during a charging operation, said one of said inner housing and said valve member being closer to the first end in the closed position than the opened position;

the other of said inner housing and said valve member acting as a pressure relief valve and being closer to the second end in the closed position than the opened position;

wherein a portion of the inner spring extends within a volume bounded by the outer spring.

8. The air conditioner system charge/relief valve of claim 7 mounted in place in an air conditioner system such that the second end is in fluid communication with an interior portion of the air conditioner system, and the first end is in fluid communication with a region exterior to the air conditioner system.

9. The invention of claim 7 wherein the inner housing comprises an elastomeric seal positioned to seal against the outer housing when the inner housing is in the closed position.

10. The invention of claim 9 wherein the valve member comprises a second elastomeric seal positioned to seal against the inner housing when the valve member is in the closed position.

11. The invention of claim 7 wherein the inner spring comprises a precision relief spring.

12. The invention of claim 1 or 7 wherein the quick release shoulder is annular in shape, and wherein the quick release shoulder forms a first ramp surface facing the first end, a second ramp surface facing the second end, and an axially-extended top surface extending between the first and second ramp surfaces.

13. The invention of claim 1 or 7 wherein all of the inner housing is disposed within the first passageway in the outer housing.

14. The invention of claim 1 or 7 wherein the valve member and the inner housing cooperate to form a valve having a valve seat and a seal, said seal configured to abut the valve seat without being received within the valve seat.

15. An air conditioner system charge/relief valve comprising:

an outer housing comprising a first passageway extending therethrough from a first end to a second end of the outer housing, and a quick release shoulder formed adjacent an outer surface of the first end;

an inner housing mounted in the first passageway for movement between a sealed position, in which the inner housing seals the first passageway, and a charging position, in which the inner housing opens the first passageway for charging, said inner housing having a second passageway formed therein, said inner housing being closer to the first end in the sealed position than the charging position;

a valve member mounted in the second passageway for movement between a closed position, in which the valve number seals the second passageway, and an opened position, in which the valve member opens the second passageway for pressure relief, said valve member being closer to the second end in the closed position than the opened position;

an inner spring mounted in the second passageway to bias the valve member toward the second end to the closed position;

an outer spring mounted in the first passageway to bias the inner housing toward the first end to the sealed position;

said inner housing accessible via the first end for receiving opening forces during a charging operation;

wherein the inner housing comprises an annular metal valve seat, and wherein the valve member comprises an elastomeric seal positioned to seal against the valve seat when the valve member is in the closed position;

wherein the valve seat is fixedly positioned in the inner housing;

wherein the inner spring reacts against a keeper, and wherein the keeper is positioned nearer the first end than is the inner spring.

16. An air conditioner system charge/relief valve comprising:

an outer housing comprising a first passageway extending therethrough from a first end to a second end of the outer housing, and a quick release shoulder formed adjacent an outer surface of the first end;

an inner housing mounted in the first passageway for movement between a closed position, in which the inner housing closes the first passageway, and an opened position, in which the inner housing opens the first passageway, said inner housing having a second passageway formed therein;

a valve member in the second passageway for movement between a closed position, in which the valve member closes the second passageway, and an opened position, in which the valve member opens the second passageway;

an inner spring mounted in the second passageway to bias the valve member toward the respective closed position;

an outer spring mounted in the first passageway to bias the inner housing toward the respective closed position;

one of said inner housing and said valve member accessible via the first end for receiving opening forces during a charging operation, said one of said inner housing and said valve member being closer to the first end in the closed position than the opened position;

the other of said inner housing and said valve member acting as a pressure relief valve and being closer to the second end in the closed position than the opened position;

wherein the inner housing comprises an annular metal valve seat, and wherein the valve member comprises an elastomeric seal positioned to seal against the valve seat when the valve member is in the closed position;

wherein the valve seat is fixedly positioned in the inner housing;

wherein the inner spring reacts against a keeper, and wherein the keeper is positioned nearer the first end than is the inner spring.

17. The invention is of claim 15 or 16 wherein the keeper is adjustably positioned in the inner housing by threads.

18. The invention of claim 15 or 16 wherein the valve seat is positioned in a plane, and wherein the elastomeric seal is guided for motion substantially at right angles to the plane.

* * * * *

UNITED STATES PATENT AND TRADEMARK OFFICE
CERTIFICATE OF CORRECTION

PATENT NO. : 5,582,202
DATED : December 10, 1996
INVENTOR(S) : Schultz, et al.

It is certified that error appears in the above-identified patent and that said Letters Patent is hereby corrected as shown below:

<u>In the Claims</u>

In Claim 17, line 1, delete "is".

Signed and Sealed this

Twenty-third Day of June, 1998

Attest:

BRUCE LEHMAN

*Attesting Officer*  *Commissioner of Patents and Trademarks*